Figure 1:
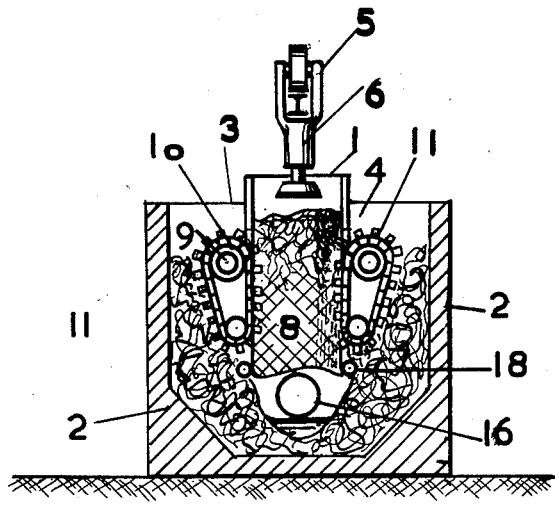

May 5, 1953 — G. ZOTOS — 2,637,544
PROCESS OF AND MEANS FOR THE CONTINUOUS
RUNNING OF INDUSTRIAL FURNACES
Filed July 21, 1947

*INVENTOR.*

Patented May 5, 1953

2,637,544

UNITED STATES PATENT OFFICE 2,637,544

PROCESS OF AND MEANS FOR THE CONTINUOUS RUNNING OF INDUSTRIAL FURNACES

George Zotos, Lausanne, Switzerland

Application July 21, 1947, Serial No. 762,389
In Great Britain June 18, 1946

9 Claims. (Cl. 263—43)

The invention concerns an improved process for the continuous running of industrial furnaces of any kind leading to some new types of such furnaces they are especially appropriate to use high temperatures avoiding at the same time different troubles in connection with the aggression of the refractory materials under hard working conditions.

The scope of the invention is to improve the working conditions in furnaces fired by direct heat, to increase the efficiency and to prolong very importantly the running period due to a better conservation of the constructional parts of furnaces in accordance with the invention.

Another purpose of the invention is to permit the use of industrial oxygen in any desirable concentration for heating the furnace in order to improve the working conditions by excluding refractory materials and replacing them by solid ingredients to be treated by heat as the limiting surfaces of the combustion chamber.

The invention concerns a new kind of feeding the raw materials as the substitute of constructional refractories and it is understood that as raw materials will be further considered any ingredients whatsoever being used within the process as a material to be molten, burned out, volatilised by heat, reduced or consumed in any other way, as well as materials that are not consumed or slightly consumed and are used as auxiliary reacting materials.

In this way the refractory constructional materials become a secondary significance, and they will be avoided as much as it seems to be possible in the design of furnaces applying the inventive process.

The invention enables further to increase the heat concentration by heating the furnace, this leading to an increased production and to relatively small proportions of the heating space and enables for this reason the manufacture of more or less sensitive substances be direct heating, such as carbides of any kind or other sensitive alloys or compounds, because the very concentrated heat acting directly upon the raw materials to be treated does not alter importantly the products once reduced or molten, and they are not constructional refractory materials subject to a substantial attack by these very aggressive products particularly concerning the upper parts of the combustion chamber.

In principle the invention consists in feeding any part of the raw materials or ingredients to be used in the manufacture under such conditions that these materials independently of their original structure become more or less compact in such a manner that introduced from outside in the furnace, operates the formation and the limitation of the high temperature heating spaces in such a manner that limiting surfaces made as usually in furnaces from refractory materials can excluded and/or replaced by materials which will be continuously renewed during the operation.

The magnitude of application is great and many useful combinations from case to case can be applied in connection with the materials to be treated or with the coal either as fuel or as ingredient for reaction or in some cases with any harmless auxiliary material which being used in accordance with the invention can be molten or consumed in any way in order to enable a better continuous running.

For ensuring that the blocks produced by the raw materials to be consumed within the process possess a sufficient stability for their motion as well as for withstanding the first stages of the heating operation before they melt, burn out, or be consumed in any way, different means can be applied during their formation, this depending on the nature and size of the raw materials. Sometimes the simple pressure provoked preferably by hydraulic means during the feeding operation may be enough for that purpose, but in other cases any addition of cheap binding material such as tar, hydraulic binding cements, or the like can be applied. Sometimes the natural moisture of ores, if conveniently pressed, or some addition of water for increasing any natural binding property can be useful for making the block resistant enough as to form positively a limitation of the combustion chamber because of its compactness and the identical composition to the produced melt, which includes similar ingredients as the raw materials.

The process furthermore offers the advantage that fines subject to troubles by treating them in usual furnaces, for instance shaft furnaces, can be very conveniently treated and minerals or other chemical substances as sediments can be separated in two categories of raw materials, the one of which can be fed to the process in accordance with the invention, the other one, especially the material of large size, as in the loose clumps, so combining the new process with the orthodox method of feeding furnaces for various operations. For avoiding troubles it was necessary before the invention to agglomerate fines by more or less expensive operations for feeding them to the proper furnace process.

Figure 2:
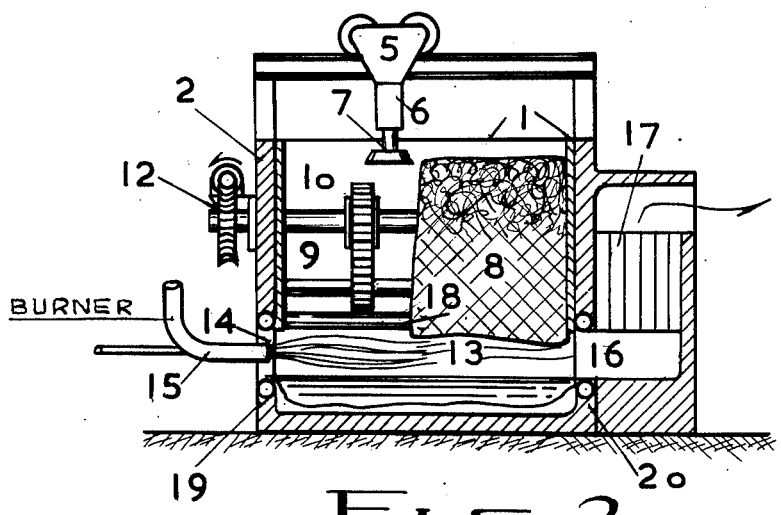

Other objects and advantages will be apparent from the following detailed description when taken in connection with the accompanying diagrammatic drawing showing some preferred embodiments of the inventive idea, in which:

Fig. 1 is a transverse vertical section of a furnace in accordance with the invention, Fig. 2 being a longitudinal central section of the same embodiment showing parts behind the central block, said block being only partially represented on this figure.

A rectangular shape 1 is arranged as a characteristic part of the device, preferably in the middle of a rectangular shaft 2 surrounding the said shape in such a manner that along the two sides chuting spaces 3 and 4 are kept free. The length of the shape 1 as well as of the surrounding walls 2 may be the same, as Fig. 2 shows. On the top of the shape hydraulic stamping means are foreseen, for instance a movable device 5 comprising any hydraulical cylinder 6 and a stamping piston 7 being fitted in such a manner as to press the materials charged within the shape 1 by any known charging means not shown. In this manner a block 8 will be artificially formed in accordance with the invention. It is understood that before starting the operation of the furnace materials may be charged within the shape and supported by any auxiliary wood supports in such a manner that underneath an initial conglomeration of the loose material can be provoked by pressing them by means of 7 going along the shape 1. After the ignition of the furnace and after heating the block this conformation can be further continuously maintained because of the action of the heat in connection with aforesaid operations. For controlling any movement of the block downwards any suitable mechanism may be foreseen, for instance by clamping the blocks from the sides and controlling any movement independently or in connection with the weight of the block or the pressure exercised by 7. A very suitable device can be composed by a pair of strong shafts 9 in connection with wheels 10 and notched chains 11, so that moving slowly each shaft 9 by a transmission 12 in opposite sense, a corresponding slow motion of the block can be ascertained and controlled under all circumstances so that to ensure that the surface 13 underneath the block is maintained at about the same level during the heating operation, in spite of its consumption.

To the effect of heating, a burner 15 is installed possibly in a symmetrical manner the surface underneath the block, while at the same time other raw materials may be chuted in the free spaces 3 and 4 of the shaft filling and keeping because of the sloping conditions a hollow space underneath the block 8, as Fig. 1 shows forming a heating chamber surrounded by materials to be treated. The burner is arranged at the opening 14 on the one side of the block, while a corresponding opening 16 on the other side allows the still overheated gases to leave the heating space. Should in this way material be molten and heated, the molten products or the fused mass can be withdrawn in any suitable manner, for instance by overflowing them from the opening to the burner or in any other usual way.

It is clear in the drawing that the said conformation of the heating space can be easily obtained and maintained during the operation by controlling the motion of the block in connection with the heating while the material once chuted in 3 and 4 is going downwards in the usual way. In this heating space very high temperatures, consequently a fast working, can be operated and it is of very great use to apply preferably highly concentrated heating means, especially oxygen in connection with any industrial fuel, for instance coal dust, gas, or fuel oil. That makes especially necessary a heat regeneration by means of any known heat recovery device 17 which can be a regenerator or recuperator for preheating the air, or a steam boiler for generating steam, or any overheater. These steps are suitable in order to ensure a high concentration of the heating in connection with preheating the air or better in using the waste heat energy for producing the necessary power to the compressors for preparation of the oxygen to be consumed by the burner.

Especially the last application of the process for preparing and using oxygen is not practicable in other furnaces because on the one hand the extremely high temperatures produced by oxygen burning cannot be applied without attacking the constructional materials of the furnace, which such installed materials are in the case of the invention substantially eliminated from the action of the hot parts of the plant and as aforesaid completely replaced by materials to be continuously supplied, on the other hand the gases leaving the process, because of avoiding substantial heat losses, are very hot, so containing high amounts of recuperable energy, rendering the direct manufacture of the oxygen suitable, if the device 17 is composed of heat receiving parts of any heat engine driving the oxygen plant.

It is also important in order to keep the desired conformation of the block to cool the edges and to retard in this way their consumption, this cooling being ascertained by pipes 18 whereby water may circulate as well as any other convenient cooling medium, and generally to take any other precaution which appears from case to case suitable so as to maintain the compacity during its slow motion downwards. Other cooling elements 19, 20 protecting parts not sufficiently covered by raw materials, along the openings, may also be foreseen.

If lime should be used, for instance for the manufacture of calcium carbide or in other metallurgical refining processes, moistening with water in connection with the heat may provoke the binding of the block. The size of the shapes as well as their proportion must correspond by designing to the particular properties of each material to be treated.

Should silica or substances of similar properties be introduced through 8, it may be generally sufficient to provoke the formation of the block only by heat, because silica as a typical example has very wide limits of sintering, so that substantially the lower parts of the block goes into a slightly viscous state before parts of the surface 13 are molten down.

The described device offers precious technological advantages in connection with the process for many manufacturing purposes. First of all any sensitive or oxidisable substance can be treated by direct heat radiation with the minimum of contact with the hot gases of the combustion being withdrawn at 16 without being conducted through the materials in the spaces 3 and 4. Using coal dust as the fuel the products are not contaminated by the ash because of the same reason, the ash going through the heating space and leaving the device so that any rate of coal dust can be fired without contaminating the products. This is not practicable in usual types of direct fired shaft furnace contaminating the products by the coal ash.

It is understood that in principle the blocks can be manufactured from the same material, or mixture of materials, or different materials could be stratified along the beds of a parallel axis to the axis of their motion, so that along the surface which is exposed to the conditions of the heating space a different resistance may be produced. This contributes to a most suitable concave conformation of the block surface limiting the heating space and can from case to case be combined or not with the cooling of the edges as aforesaid, this being illustrated on the right part of the section through the block in Fig. 1.

The cited examples are suitable for many applications, but as far as industrial furnaces are devices which can vary in an exceptionally wide range with regard to each particular application it is understood that any type of furnace can be combined or completed by means of the invention under consideration of each special manufacturing case.

I do not wish to limit myself to the precise conditions or details of the described combinations, as they may be varied by those skilled in the art in accordance with the particular purpose for which they are intended, and the conditions under which they are to be utilized in any special case in connection with the proper requirements of any melting, reducing, chemical or metallurgical process or any other manufacturing process based on the use of high temperature heat with materials to be treated in any way by heat.

I claim:

1. A process for feeding directly fired industrial furnaces in order to insure continuous run including the steps of using positive means for forming a consistant movable block of artificially predetermined cross section by materials to be continuously fed and treated by heat, shaping a hollow heating space by means of said block, keeping said space in a constant conformation by means of controlling the continuous material supply and the controlled motion of said block in order to pre-form a combustion chamber and heating said combustion chamber by direct combustion heat.

2. A process in accordance with claim 1, wherein the means for making the block include artificial compression of loose raw materials by using mechanical elements which develop controllable pressure within a shape as to obtain the required cross section of said block before reaching the combustion chamber.

3. In a process in accordance with claim 1, the use of additional mechanical means for the controlled motion of said block as a whole, said means consisting of independent mechanical elements clamping and slowly moving the block at the required rate for keeping the constant conformation of the combustion chamber.

4. In a process for feeding directly fired furnaces in order to ensure continuous run by forming and moving a consistent block of predetermined cross section by materials to be fed as a whole and consumed as the limiting surface inside the combustion chamber the step of cooling the edges of said block and maintaining by said cooling and by the motion a controlled concavity of the continuously melting surface of said block.

5. In a process in accordance with claim 3 the step of ranging raw materials of different fusion point as stratified layers parallel to the axis of motion of the compact block and having the higher fusing ingredient near the edges for retarding their fusion.

6. A process for feeding directly fired industrial furnaces in order to ensure continuous run including the steps of forming a consistent block by hydraulic pressing raw materials through a vertical shape of rectangular cross section, lowering slowly the block, feeding additional raw materials along two parallel sides of said block thus forming a combustion chamber substantially limited by said raw materials and heating by direct combustion within said chamber.

7. In a process in accordance with claim 6 passing a gaseous stream of heating ingredients through the combustion chamber and withdrawing the still superheated exhaust gases through an exhaust opening, so preventing said gas to rise through loose raw materials.

8. A process for feeding directly fired industrial furnaces in order to ensure continuous run including the steps of forming a consistent block by pressing raw materials through a vertical shape, lowering slowly the block as to maintain by means of the one side the limitation of the upper part of the combustion chamber, feeding additional raw materials along two parallel sides of said block and maintaining said combustion chamber substantially limited by raw materials, heating by passing an ignited stream of oxygen and fuel through the combustion chamber, withdrawing the still superheated gases through an exhaust opening and using their heat content for the power production required for the oxygen production.

9. In directly fired furnaces in combination means for pressing the continuously fed raw materials through shapes in order to form compact movable blocks, means for moving said blocks towards a combustion chamber, means for cooling the edges of said blocks, means for heat generation by direct combustion and means for collecting the heated gases leaving said combustion chamber.

GEORGE ZOTOS.

References Cited in the file of this patent

UNITED STATES PATENTS

| Number | Name | Date |
| --- | --- | --- |
| 1,283,500 | Gray | Nov. 5, 1918 |
| 1,656,828 | Powell | Jan. 17, 1928 |
| 1,904,781 | Crawford | Apr. 18, 1933 |
| 1,926,032 | Bunce et al. | Sept. 12, 1933 |
| 1,948,696 | Brassert et al. | Feb. 27, 1934 |
| 2,178,871 | Drill | Nov. 7, 1939 |
| 2,439,367 | Middlestadt | Apr. 6, 1948 |
| 2,473,681 | Hansen | June 21, 1949 |

FOREIGN PATENTS

| Number | Country | Date |
| --- | --- | --- |
| 597,837 | France | Sept. 11, 1925 |